(12) United States Patent
Hoashi

(10) Patent No.: US 11,650,321 B2
(45) Date of Patent: May 16, 2023

(54) APPARATUS AND METHOD FOR DETECTING TILT OF LIDAR APPARATUS MOUNTED TO VEHICLE

(71) Applicant: DENSO CORPORATION, Kariya (JP)

(72) Inventor: Yoshiaki Hoashi, Kariya (JP)

(73) Assignee: DENSO CORPORATION, Kariya (JP)

(*) Notice: Subject to any disclaimer, the term of this patent is extended or adjusted under 35 U.S.C. 154(b) by 335 days.

(21) Appl. No.: 17/038,264

(22) Filed: Sep. 30, 2020

(65) Prior Publication Data

US 2021/0097324 A1    Apr. 1, 2021

(30) Foreign Application Priority Data

Sep. 30, 2019  (JP) .............................. JP2019-178465

(51) Int. Cl.
| | |
|---|---|
| *G01S 7/497* | (2006.01) |
| *B60W 50/14* | (2020.01) |
| *G01S 17/86* | (2020.01) |
| *G05D 1/02* | (2020.01) |
| *B60W 30/095* | (2012.01) |
| *B60W 60/00* | (2020.01) |
| *G06V 10/24* | (2022.01) |
| *G06V 10/44* | (2022.01) |
| *G06V 20/58* | (2022.01) |
| *G01S 17/931* | (2020.01) |
| *G06V 20/64* | (2022.01) |

(52) U.S. Cl.
CPC ....... *G01S 7/4972* (2013.01); *B60W 30/0956* (2013.01); *B60W 50/14* (2013.01); *B60W 60/001* (2020.02); *B60W 60/0053* (2020.02); *G01S 17/86* (2020.01); *G05D 1/0214* (2013.01); *G06V 10/243* (2022.01); *G06V 10/44* (2022.01); *G06V 20/582* (2022.01); *B60W 2420/52* (2013.01); *B60W 2554/20* (2020.02); *G01S 17/931* (2020.01); *G06V 20/64* (2022.01)

(58) Field of Classification Search
CPC ......... G01S 7/4972; G01S 7/86; B60W 50/14
See application file for complete search history.

(56) References Cited

U.S. PATENT DOCUMENTS

| 9,537,956 | B1 | 1/2017 | Sibenac et al. |
|---|---|---|---|
| 11,243,308 | B2* | 2/2022 | Matsui .................. G01S 17/931 |
| 2020/0410260 | A1* | 12/2020 | Choe ...................... G06T 11/203 |
| 2021/0094550 | A1* | 4/2021 | Jiang ....................... G01S 7/497 |

FOREIGN PATENT DOCUMENTS

| JP | 2006260105 A | 9/2006 |
|---|---|---|
| JP | 2019086393 A | 6/2019 |

* cited by examiner

*Primary Examiner* — Bryan Bui
(74) *Attorney, Agent, or Firm* — Maschoff Brennan

(57) ABSTRACT

A detection apparatus detects a tilt of a LiDAR apparatus that is mounted to a vehicle. The detection apparatus includes a distance image acquiring unit, a surroundings information acquiring unit, and a detecting unit. The distance image acquiring unit acquires a distance image that is expressed by a detection point group that is detected by the LiDAR apparatus. The surroundings information acquiring unit acquires surroundings information on a periphery of a traveling route of the vehicle. The detecting unit that determines the tilt of the LiDAR apparatus based on the acquired distance image and the acquired surroundings information.

13 Claims, 5 Drawing Sheets

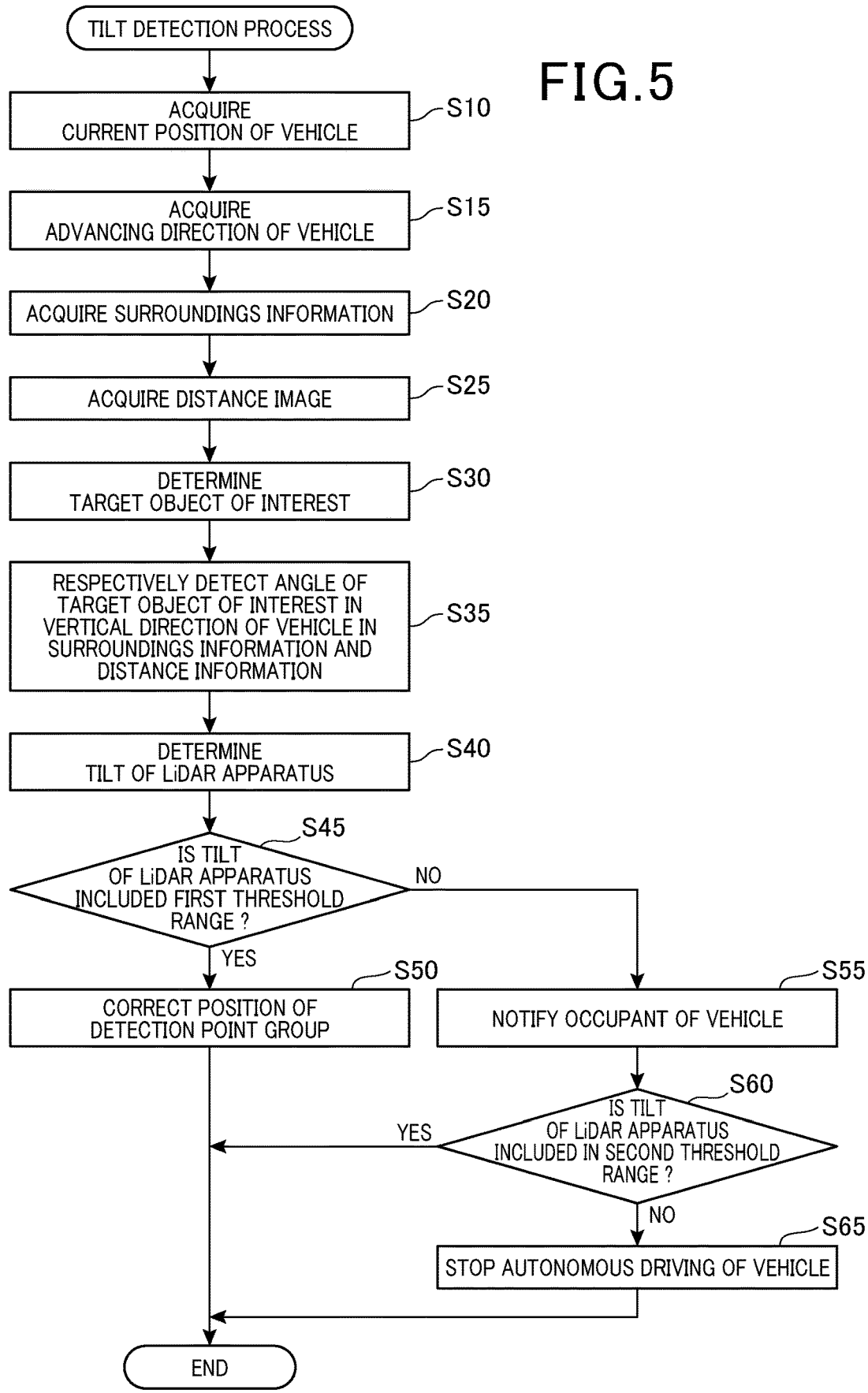

APPARATUS AND METHOD FOR DETECTING TILT OF LIDAR APPARATUS MOUNTED TO VEHICLE

CROSS-REFERENCE TO RELATED APPLICATIONS

This application is based on and claims the benefit of priority from Japanese Patent Application No. 2019-178465, filed Sep. 30, 2019. The entire disclosure of the above application is incorporated herein by reference.

BACKGROUND

Technical Field

The present disclosure relates to a technology for detecting a tilt of a light detection and ranging (LiDAR) apparatus that is mounted to a vehicle.

Related Art

Technology that enables automatic traveling of a vehicle through use of detection results of a camera, a laser radar, a LiDAR apparatus, and the like, that are mounted to a vehicle, is known.

SUMMARY

One aspect of the present disclosure provides a detection apparatus that detects a tilt of a LiDAR apparatus that is mounted to a vehicle. The detection apparatus acquires a distance image that is expressed by a detection point group that is detected by the LiDAR apparatus, acquires surroundings information on a periphery of a traveling route of the vehicle, and determines the tilt of the LiDAR apparatus based on the acquired distance image and the acquired surroundings information.

BRIEF DESCRIPTION OF THE DRAWINGS

In the accompanying drawings:

FIG. 5 is a flowchart of the processing steps in a tilt detection process.

DESCRIPTION OF THE EMBODIMENTS

Technology that enables automatic traveling of a vehicle through use of detection results of a camera, a laser radar, a LiDAR apparatus, and the like, that are mounted to a vehicle, is known (for example, U.S. Pat. No. 9,537,959).

However, the LiDAR apparatus may become tilted as a result of deterioration over time of a bracket that fixes the LiDAR apparatus to the vehicle, impact that occurs when the vehicle collides with an obstacle, and the like. Consequently, a problem may occur in that a target in the periphery of the vehicle is not accurately recognized. It is thus desired to provide a technology for detecting a tilt of a LiDAR apparatus that is mounted to a vehicle.

An exemplary embodiment of the present disclosure provides a detection apparatus that detects a tilt of a LiDAR apparatus that is mounted to a vehicle. The detection apparatus includes: a distance image acquiring unit that acquires a distance image that is expressed by a detection point group that is detected by the LiDAR apparatus; a surroundings information acquiring unit that acquires surroundings information on a periphery of a traveling route of the vehicle; and a detecting unit that determines the tilt of the LiDAR apparatus based on the acquired distance image and the acquired surroundings information.

As a result of the detection apparatus according to the above-described exemplary embodiment, the distance image expressed by the detection point group that is detected by the LiDAR apparatus is acquired. The surroundings information on the periphery of the traveling route of the vehicle is acquired. The tilt of the LiDAR apparatus is determined through use of the acquired distance image and the acquired surroundings information. Therefore, the tilt of the LiDAR apparatus can be easily detected.

The present disclosure can be implemented according to various embodiments. For example, the present disclosure can be implemented according to embodiments such as a tilt detection apparatus, a tilt detection method, a computer program for implementing the apparatus and method, a storage medium in which the computer program is stored, and the like.

A. EMBODIMENT

A1. Apparatus Configuration

Figure 1:
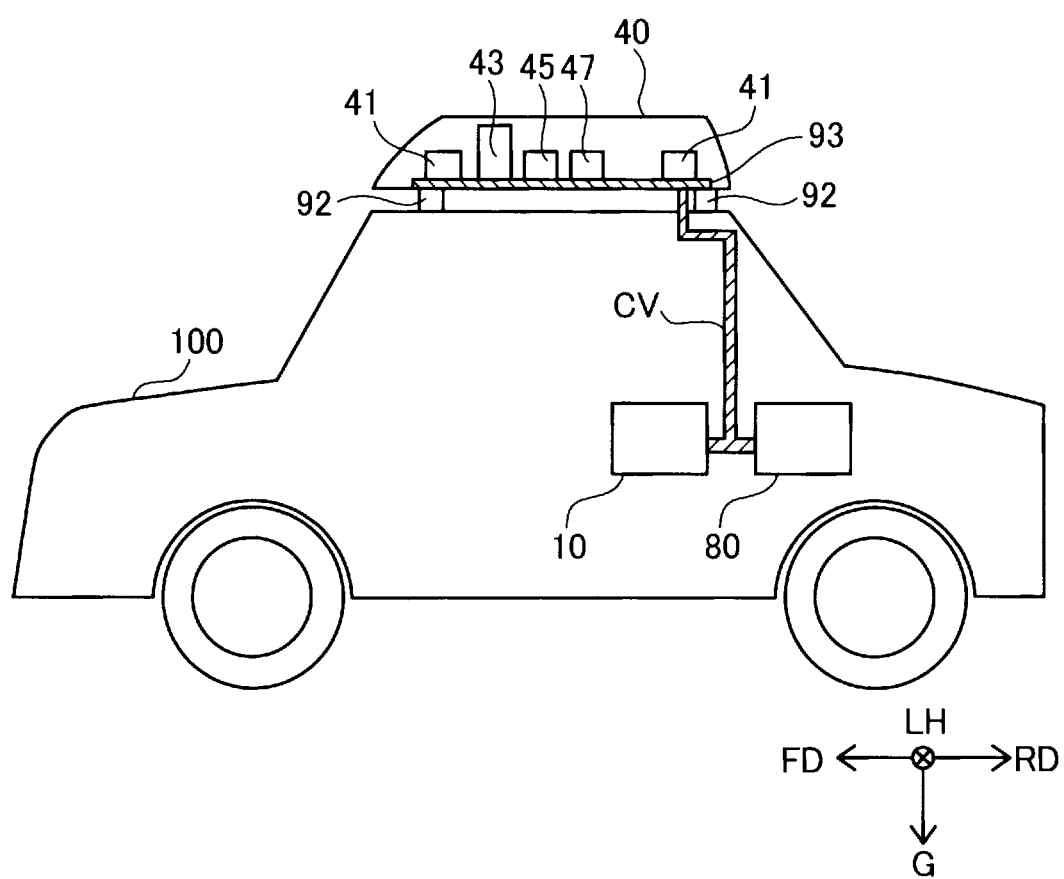
FIG. 1 is an explanatory diagram of an example of a vehicle in which a tilt detection apparatus is mounted according to an embodiment of the present disclosure.
Figure 2:
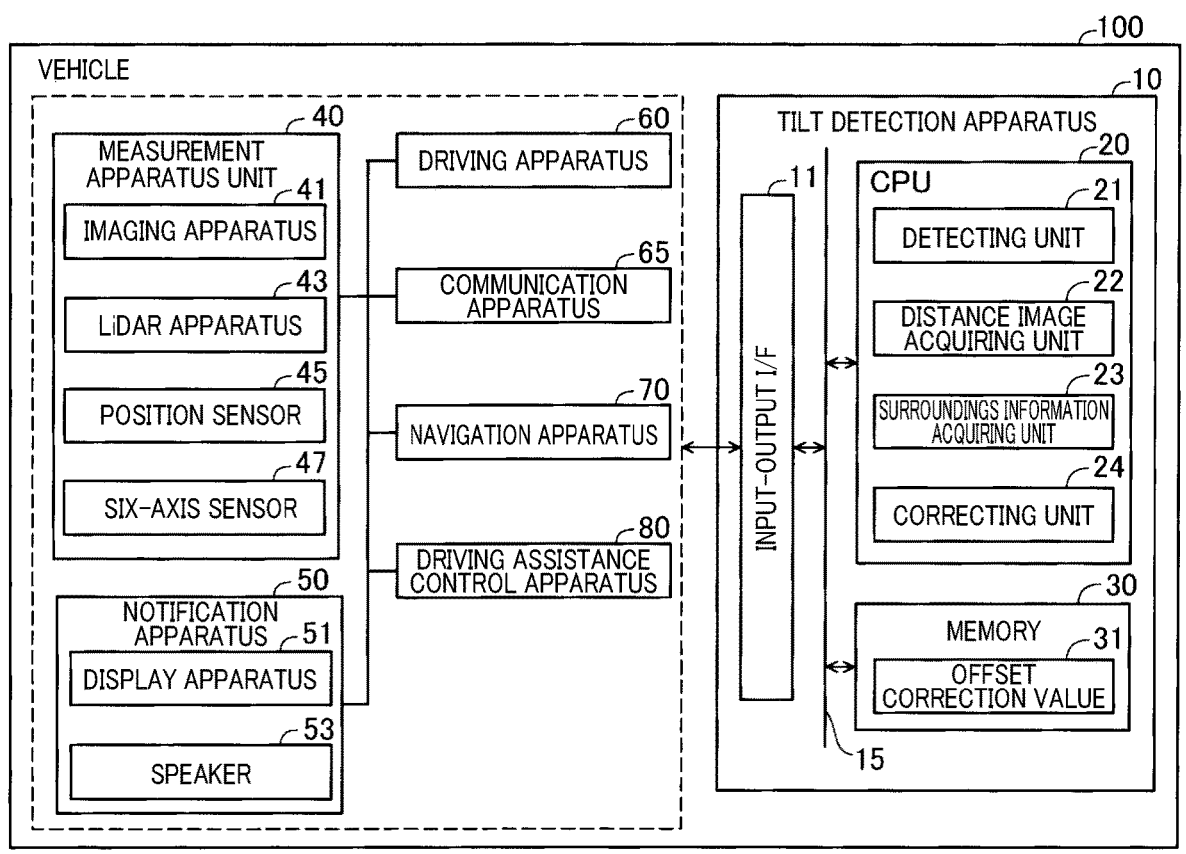
FIG. 2 is a block diagram of an overall configuration of the vehicle and the tilt detection apparatus.

As shown in FIG. 1 and FIG. 2, a vehicle 100 includes a measurement apparatus unit 40, a tilt detection apparatus 10, and a driving assistance control apparatus 80. The vehicle 100 is a vehicle in which switching between autonomous driving and manual driving can be performed.

A driver of the vehicle 100 can switch between autonomous driving and manual driving by a predetermined switch that is provided in an instrument panel or the like. "Autonomous driving" refers to driving in which engine control, brake control, and steering control are all automatically performed instead of being performed by the driver, as a result of a driving apparatus 60, described hereafter, being driven based on states inside and outside a vehicle cabin that are acquired by the measurement apparatus unit 40, without the driver performing driving operations.

The driving apparatus 60 includes an actuator group that is used in driving of the vehicle 100. "Manual driving" refers to driving in which the driver performs an operation (pressing of an accelerator pedal) for engine control, an operation (pressing of a brake pedal) for brake control, and an operation (rotation of a steering wheel) for steering control.

The measurement apparatus unit 40 is mounted on a roof of the vehicle 100. The measurement apparatus unit 40 is fixed to the vehicle 100 by a fixing mechanism 92 and a frame 93. Here, FIG. 1 shows a vehicle width direction LH, a vehicle frontward direction FD, a vehicle rearward direction RD, and a vertically downward direction G. Symbols and arrows that indicate these directions in FIG. 1 correspond to symbols and arrows that indicate directions in other drawings.

The measurement apparatus unit 40 acquires information related to a traveling state of the vehicle 100, information related to a target in the periphery of the vehicle 100, and the like. As shown in FIG. 2, the measurement apparatus 40 includes at least an imaging apparatus 41, a LiDAR apparatus 43, a position sensor 45, and a six-axis sensor 47.

The imaging apparatus 41 is oriented towards the periphery of the vehicle 100 and captures an image in at least an advancing direction of the vehicle 100. For example, the imaging apparatus 41 is an imaging apparatus, such as a wide-angle camera or a telescopic camera, that includes an image sensor, such as a charge-coupled device (CCD), or an image sensor array. The imaging apparatus 41 receives visible light and thereby outputs outer appearance information or shape information of a target as image data that is a detection result.

The LiDAR apparatus 43 is oriented towards the advancing direction of the vehicle 100. The LiDAR apparatus 43 emits infrared laser light and receives reflected light that is reflected by a target. The LiDAR apparatus 43 thereby detects a distance and an angle of the target in relation to the vehicle 100 and acquires the target as a detection point group. A detection point refers to a point that indicates a position in which at least a portion of the target identified by the reflected light may be present, within a detectable range of the LiDAR apparatus 43.

In addition, the detection point group refers to a collection of detection points within a predetermined period. The detection point group is expressed as a distance image by three-dimensional coordinates of the detection points. Here, the detection point is meant to include both a distance measurement point that is detected by time of flight (TOF) of light, and a detection point that is expressed by a luminance value that is inputted to a light receiving element that is provided in the LiDAR apparatus 43. According to the present embodiment, resolution of the LiDAR apparatus 43 is a value that ranges from 0.1 degrees to 0.2 degrees in both a horizontal direction and a vertical direction.

The position sensor 45 detects an own position of the vehicle 100. The own position is expressed by a latitude and a longitude of the vehicle 100. For example, a global navigation satellite system (GNSS) and a gyro sensor can be given as the position sensor 45. Here, the own position may include an altitude of the vehicle 100.

The six-axis sensor 47 detects an orientation (advancing direction) of the vehicle 100 and an attitude of the vehicle 100. For example, a motion sensor that includes a three-axis acceleration sensor and a three-axis gyro sensor can be used as the six-axis sensor 47.

As shown in FIG. 1, the tilt detection apparatus 10 and the driving assistance control apparatus 80 are mounted inside the vehicle 100. The tilt detection apparatus 10 and the driving assistance control apparatus 80 are connected to the measurement apparatus unit 40 by wiring CV.

The tilt detection apparatus 10 detects a tilt of the LiDAR apparatus 43 in a vertical direction of the vehicle 100. As shown in FIG. 2, the tilt detection apparatus 10 is configured as a single or a plurality of electronic control units (ECUs) in which a central processing unit (CPU) 20, a memory 30, and an input-output interface 11 are mounted. The CPU 20, the memory 30, and the input-output interface 11 are connected by a bus 15 so as to be capable of two-way communication. The CPU 20 functions as a detecting unit 21, a distance image acquiring unit 22, a surroundings information acquiring unit 23, and a correcting unit 24 by opening and running a program that is stored in the memory 30.

The detecting unit 21 detects the tilt of the LiDAR apparatus 43 in the vertical direction of the vehicle 100 by collating the distance image generated by the LiDAR apparatus 43 and information (referred to, hereafter, as "surroundings information") on the periphery of a traveling route of the vehicle 100 in a tilt detection process, described hereafter.

According to the present embodiment, the "surroundings information" refers to information that indicates a gradient of the traveling route of the vehicle 100, and information that indicates positions and shapes of ground objects, such as road facilities and buildings, that are provided in the periphery of the traveling route. For example, the surroundings information includes map information, and coordinate information regarding a captured image of the imaging apparatus 41 and the like. In addition, for example, as the above-described road facilities, guardrails, traffic signs, road information display boards indicating traffic congestion information and guidance information, and footbridges are applicable. Furthermore, the road facilities also include road markings such as boundary lines, stop lines, and crosswalks.

Figure 3:
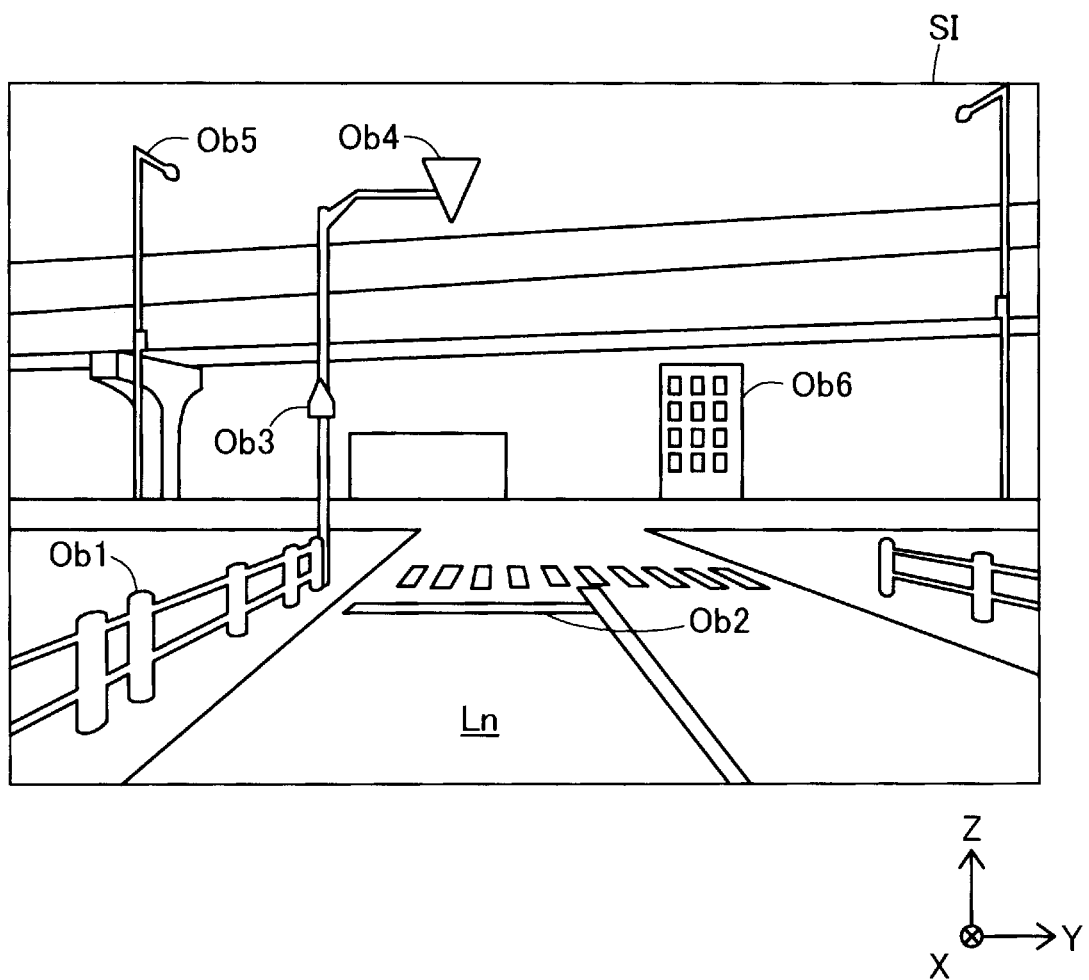
FIG. 3 is an explanatory diagram of an example of surroundings information.

Surroundings information SI shown as an example in FIG. 3 is map information on the periphery of a traveling route Ln of the vehicle 100. The surroundings information SI includes information that indicates the positions (coordinates) and the shapes of a guardrail Ob1, traffic signs Ob3 and Ob4, a road illumination apparatus Ob5, a stop line Ob2, a building Ob6, and the like that are present in the vehicle frontward direction FD. The vehicle frontward direction FD is the advancing direction of the vehicle 100.

In FIG. 3, an X axis and a Y axis are set to be parallel to the horizontal direction of the vehicle 100. A Z axis is set to be parallel to the vertical direction. The X axis is parallel to the advancing direction of the vehicle 100. A +X direction is the vehicle frontward direction FD and a −X direction is the vehicle rearward direction RD. The Y axis is parallel to the width direction of the vehicle 100. A +Y direction is the vehicle width direction LH.

The detecting unit 21 respectively extracts a specific object from the surroundings information SI and the distance image. The detecting unit 21 then calculates an elevation/depression angle of the LiDAR apparatus 43 by determining an angle between line segments in the horizontal direction of both extracted objects. The detecting unit 21 determines the calculated elevation/depression angle to be the tilt of the LiDAR apparatus 43. Here, detailed descriptions regarding the tilt of the LiDAR apparatus 43 and a method for detecting the tilt of the LiDAR apparatus 43 will be given hereafter.

The distance image acquiring unit 22 acquires the distance image that is generated by the LiDAR apparatus 43.

The surroundings information acquiring unit 23 acquires the surroundings information SI from a traffic management system or the like, through a communication apparatus 65. Here, the surroundings information acquiring unit 23 may acquire map data from a navigation apparatus 70, instead of the traffic management system. Alternatively, the surroundings information acquiring unit 23 may acquire a captured image of an area in the advancing direction of the vehicle 10 from the imaging apparatus 41.

The correcting unit 24 corrects the detection result of the LiDAR apparatus 43 using the tilt of the LiDAR apparatus 43 determined by the detecting unit 21. Specifically, the correcting unit 24 updates an offset correction value 31 with the determined tilt value of the LiDAR apparatus 43. The offset correction value 31 is stored in the memory 30. As a result, when the driving assistance control apparatus 80 recognizes a target in the periphery of the vehicle 100 using the detection point group detected by the LiDAR 43, the position of the detection point group in the vertical direction is corrected with reference to the offset correction value 31.

The driving assistance control apparatus 80 is configured by a single or a plurality of ECUs in which a CPU, a memory, and an interface are mounted (not shown). The driving assistance control apparatus 80 controls the driving apparatus 60, described hereafter, that is mounted to the vehicle 100. The driving assistance control apparatus 80 thereby performs driving assistance, that is, braking assistance, steering assistance and driving assistance of the vehicle 100.

In addition to the above-described measurement apparatus unit 40 and the driving assistance control apparatus 80, a notification apparatus 50, the driving apparatus 60, the communication apparatus 65, and the navigation apparatus 70 are mounted to the vehicle 100.

The notification apparatus 50 notifies an occupant of the vehicle 100 of various types of information through visual information and audio information. The notification apparatus 50 includes a display apparatus 51 and a speaker 53 that are oriented towards the interior of the vehicle cabin of the vehicle 100. The display apparatus 51 displays characters, images, and the like. The speaker 53 outputs voice, warning sounds, and the like.

The driving apparatus 60 includes a driving unit, a steering apparatus, and a brake apparatus (not shown). The driving unit includes at least either of an internal combustion engine and a motor. The driving unit generates driving force for traveling. The steering apparatus includes an electric steering mechanism and the like. The steering apparatus implements steering of the vehicle 100. The brake apparatus includes a disk brake and the like. The brake apparatus implements braking of the vehicle 100.

The communication apparatus 65 performs exchange of data, such as the surroundings information SI, by performing wireless communication between the vehicle 100 and an external party outside the vehicle 100. For example, as the external party outside the vehicle 100, a traffic management system such as an intelligent transport system, a roadside wireless transceiver, and another vehicle that is traveling the periphery of the vehicle 100 are applicable.

The navigation apparatus 70 performs route search and route guidance using electronic map data. The electronic map data includes road network data, road data, and the like.

A2. Tilt Detection Process

Figure 4:
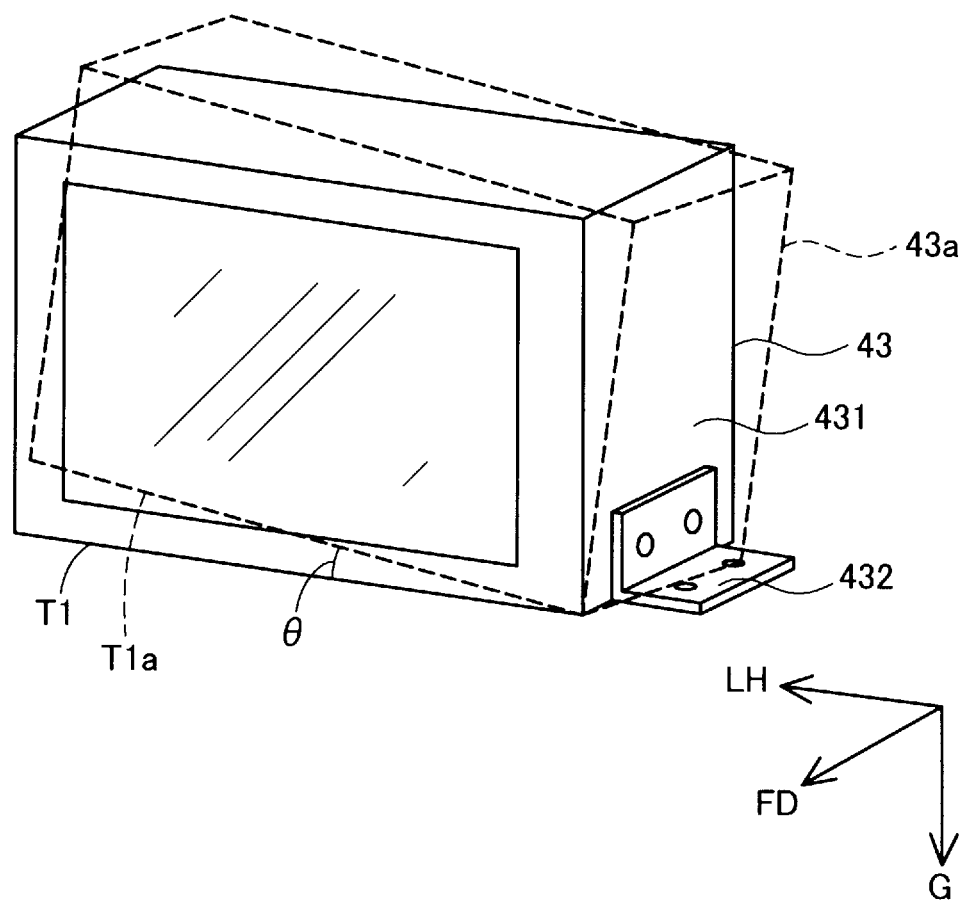
FIG. 4 is an explanatory diagram for explaining a tilt of a LiDAR apparatus.

Before the tilt detection process is described, the tilt of the LiDAR apparatus 43 will be described with reference to FIG. 4. As shown by solid lines, the LiDAR apparatus 43 has a substantially rectangular parallelepiped shape and is fastened to the vehicle 100 by a fixture 432. A light emitting unit for infrared laser light, a light receiving unit for reflected light that is reflected by a target, and the like are housed inside a casing 431 of the LiDAR apparatus 43. The LiDAR apparatus 43 is attached to the vehicle 100 such that a lower side of a bottom surface of the casing 431 is parallel with the horizontal direction of the vehicle 100. A mounted state indicated by the solid lines is an originally correct attitude.

The LiDAR apparatus 43a that is shown by broken lines indicates a state in which the LiDAR apparatus 43 is tilted in the vertical direction of the vehicle 100. Specifically, the LiDAR apparatus 43a is the LiDAR apparatus 43 that is tilted in an upward direction of the vehicle 100 by an angle θ. A lower side T1a of the bottom surface of the casing of the LiDAR apparatus 43a is shifted vertically upward from the horizontal direction of the vehicle 100 by an angle θ and intersects the horizontal direction. Therefore, the tilt of the LiDAR apparatus 43 can be determined by the angle θ being determined.

In the tilt detection process according to the present embodiment, the shift in the angle in relation to the horizontal direction of the LiDAR apparatus 43 is detected through use of the surroundings information SI and the distance image. That is, an object that is present in the periphery of the traveling route Ln of the vehicle 100 is respectively extracted from the surroundings information SI and the distance image. An angle of shifting of a side in the horizontal direction of the object that is extracted from the distance image with reference to a side in the horizontal direction of the object that is extracted from the surroundings information SI is detected. The tilt of the LiDAR apparatus 43 is thereby determined.

As described above, in the LiDAR apparatus 43 according to the present embodiment, the resolution in the vertical direction is a value that ranges from 0.1 degrees to 0.2 degrees. Therefore, the side extending in the horizontal direction of the object can be accurately detected.

The tilt detection process shown in FIG. 5 is repeatedly performed at a predetermined interval while the vehicle 100 is traveling. The predetermined interval may be several seconds to ten-odd seconds. The tilt detection process is started when a signal that indicates that an ignition switch is switched from off to on is inputted from a high-order ECU that controls the overall vehicle 100.

The detecting unit 21 acquires a current position of the vehicle 100 from the detection result of the position sensor 45 (step S10). The detecting unit 21 acquires the advancing direction of the vehicle 100 from the detection result of the six-axis sensor 47 (step S15). The surroundings information acquiring unit 23 acquires the surroundings information SI (step S20). At this time, the surroundings information acquiring unit 23 acquires the surroundings information SI in which the orientation of the surroundings information SI matches the advancing direction of the vehicle 100. The distance image acquiring unit 22 acquires the distance image from the detection result of the LiDAR apparatus 43 (step S25).

The detecting unit 21 determines a target object of interest (step S30). According to the present embodiment, the "target object of interest" refers to a target object that is present in a position closest to the vehicle 100, among objects that are present in the periphery of the traveling route Ln of the vehicle. The detecting unit 21 references the surroundings information SI and, among objects that are present in the periphery of the vehicle 100, such as among road facilities, identifies a road facility that is present in a position closest to the vehicle 100 as the target object of interest.

In the surroundings information SI shown as an example in FIG. 3, the guardrail Ob1 can be identified as the target object of interest. Here, when the identified target object of interest cannot be detected in the distance image, the detecting unit 21 may identify a road facility that is present in a position second closest to the vehicle 100 (the stop line Ob2 or the traffic sign Ob3 in the example shown in FIG. 3) as the target object of interest The detecting unit 21 respectively detects an angle of the target object of interest in the vertical direction of the vehicle 100 in the surroundings information SI and the distance image (step S35). Specifically, the detecting unit 21 detects the target object of interest from the surroundings information SI. The detecting unit 21 identifies a side of the target object of interest that is parallel to the horizontal direction of the vehicle 100. The detecting unit 21 then determines an angle that is formed by the identified side and the horizontal direction of the vehicle 100.

More specifically, first, the detecting unit 21 detects a plurality of X coordinates, Y coordinates, and Z coordinates of the detection points (such as representative points) that configure the target object of interest. Using the least squares method, the detecting unit 21 detects a line segment that is parallel to the horizontal direction or an approximate line segment thereof in the target object of interest. Next, with the horizontal direction of the vehicle 100 as reference, the detecting unit 21 determines an angle of the line segment in relation to this reference.

Here, the side of the target object of interest that is parallel to the horizontal direction of the vehicle 100 may be a line segment that connects detection points that correspond to terminal points, among the detection points that configure the target object of interest. Alternatively, the side of the target object of interest that is parallel to the horizontal direction of the vehicle 100 may be a line segment that connects a detection point that corresponds to an intermediate point and a detection point that correspond to a terminal point, among the detection points that configure the target object of interest. Moreover, the detecting unit 21 may determine the line segment using an edge extraction process instead of the least squares method.

The detecting unit 21 detects the angle of the target object of interest in the distance image through similar steps. Specifically, the detecting unit 21 detects an object that is assumed to be the target object of interest from the distance image. The detecting unit 21 identifies a side of the detected target object of interest that is parallel to the horizontal direction of the vehicle 100. The detecting unit 21 then determines an angle that is formed by the identified side and the horizontal direction of the vehicle 100.

The detecting unit 21 determines the tilt of the LiDAR apparatus 43 (step S40). Specifically, the detecting unit 21 detects a difference between the angle of the target object of interest in the surroundings information SI and the angle of the target object of interest in the distance image detected at above-described step S35, and determines the detected difference to be the tilt of the LiDAR apparatus 43.

The detecting unit 21 determines whether the determined tilt of the LiDAR apparatus 43 is included in a first threshold range (step S45). According to the present embodiment, the "first threshold range" refers to a range in which the angle in the vertical direction of the vehicle 100 ranges from −5 degrees to +5 degrees when the horizontal direction of the vehicle 100 is 0 degrees. When the detecting unit 21 determined that the determined tilt of the LiDAR apparatus 43 is included in the first threshold range (YES at step S45), the correcting unit 24 corrects the position of the detection point group (step S50). Specifically, the correcting unit 24 updates the offset correction value 31 that is stored in the memory 30.

When determined that the determined tilt of the LiDAR apparatus 43 exceeds the first threshold range at step S45 (NO at step S45), the detecting unit 21 notifies the occupant of the vehicle 100 using the notification apparatus 50 (step S55). For example, the detecting unit 21 enables the notification apparatus 50 to perform notification display or voice guidance that states, "Please have the LiDAR apparatus 43 inspected at an automobile dealership."

The detecting unit 21 determines whether the determined tilt of the LiDAR apparatus 43 is included in a second threshold range (step S60). According to the present embodiment, the "second threshold range" is a range in which the angles in the vertical direction of the vehicle 100 are greater than those of the first threshold range. The "second threshold range" refers to a range in which the angle in the vertical direction of the vehicle 100 ranges from −30 degrees to +30 degrees or, preferably, −25 degrees to +25 degrees. When determined that the determined tilt of the LiDAR apparatus 43 is not included in the second threshold range (NO at step S60), the detecting unit 21 stops autonomous driving of the vehicle 100 (step S65). Specifically, the detecting unit 21 stops execution of autonomous driving of the vehicle 100 by the driving assistance control apparatus 80. In addition, the detecting unit 21 gives notification to prompt the driver of the vehicle 100 to perform manual driving and notification to prompt inspection of the vehicle 100, using the notification apparatus 50.

When the detecting unit 21 determines that the determined tilt of the LiDAR apparatus 43 is included in the second threshold range at above-described step S60 (YES at step S60), or after above-described step S65 is performed, the tilt detection process is ended.

In the tilt detection apparatus 10 according to the present embodiment configured as described above, the distance image expressed by the detection point group that is detected by the LiDAR apparatus 43 is acquired. The surroundings information SI on the periphery of the traveling route Ln of the vehicle 100 is acquired. The tilt of the LiDAR apparatus 43 is determined through use of the acquired distance image and the acquired surroundings information SI. Therefore, the tilt of the LiDAR apparatus 43 can be easily detected. Specifically, the detecting unit 21 determines a target object of interest from the road facilities that are present in the periphery of the traveling route Ln.

The detecting unit 21 detects the difference between the angle of the target object of interest in the vertical direction of the vehicle 100 in the surroundings information SI and the angle of the target object of interest in the vertical direction of the vehicle 100 in the distance image. The detecting unit 21 thereby determines the tilt of the LiDAR apparatus 43. Therefore, the tilt of the LiDAR apparatus 43 can be determined without complicated processes being required. In addition, because the target object of interest is the guardrail Ob1, the target object of interest can be easily identified.

The correcting unit 24 corrects the position of the detection point group in the vertical direction using the determined tilt of the LiDAR apparatus 43. Therefore, even if the LiDAR apparatus 43 is tilted in the vertical direction of the vehicle 100 from the attitude at the time of mounting to the vehicle 100, the position of the detection point group detected by the LiDAR apparatus 43 can be set to a position in which the detection point group should originally be detected. Consequently, occurrence of an issue in that a target in the periphery of the vehicle 100 cannot be accurately detected can be suppressed.

In addition, when the determined tilt of the LiDAR apparatus 43 exceeds the first threshold range, the detecting unit 21 notifies the occupant of the vehicle 100 using the notification apparatus 50. Consequently, the occupant of the vehicle 100 can be made aware that the LiDAR apparatus 43 is tilted from the originally correct attitude and, therefore, inspection of the vehicle 100 is required.

In addition, when the determined tilt of the LiDAR apparatus 43 exceeds the second threshold range, the detecting unit 21 stops autonomous driving of the vehicle 100.

Therefore, the detection result of the LiDAR apparatus 43 can be prevented from being used in driving assistance of the vehicle 100. Consequently, problems occurring in driving assistance of the vehicle 100 can be suppressed.

B. OTHER EMBODIMENTS (1) According to the above-described embodiment, the detecting unit 21 may determine the tilt of the LiDAR apparatus 43 by comparing edges in the horizontal direction of a building. Specifically, at above-described step S30, the detecting unit 21 identifies the building Ob6 that is present in a position closest to the vehicle 100 as the target object of interest. Next, at above-described step S35, the detecting unit detects the target object of interest from the surroundings information SI and, for example, extracts an edge in the horizontal direction of the target object of interest based on luminance values.

In addition, the detecting unit 21 similarly extracts an edge in the horizontal direction of the target object of interest in the distance image, as well. Subsequently, the detecting unit 21 compares the extracted edge in the surroundings information SI and the extracted edge in the distance image, and detects an angle of shifting of the edges. The detecting unit 21 may thereby determine the tilt of the LiDAR apparatus 43. As a result of a configuration such as this, the tilt of the LiDAR apparatus 43 can be more accurately determined.

(2) According to the above-described embodiments, the target object of interest is not limited to guardrails and buildings. The target object of interest may be an arbitrary object that is present on the traveling route Ln of the vehicle 100 and the periphery thereof, such as a road marking such as a lane marker, a crosswalk, or a stop line on the traveling route Ln, or a road facility such as a traffic sign, traffic lights, a footbridge, or a road information display board.

(3) According to the above-described embodiments, the detecting unit 21 may determine the tilt of the LiDAR apparatus 43 using past detection values of the angle of a target object of interest in the distance image and the surroundings information SI. Specifically, the detecting unit 21 may store the angles of the target object of interest detected at above-described step S35 in the memory 30 and, for example, determine the tilt of the LiDAR apparatus 43 using an average value of ten differing angles detected for the target object of interest.

At this time, when a detection value that is far from a predetermined reference value is present, the detection value may be excluded. As a result, for example, even in cases in which objects that can be detected differ between the distance image and the surroundings information SI, such as when a road facility is temporarily removed due to construction or the like, the tilt of the LiDAR apparatus 43 can be accurately determined.

(4) According to the above-described embodiments, the tilt of the LiDAR apparatus 43 is determined through use of the angle of the target object of interest in the vertical direction of the vehicle 100. However, the angle of the target object of interest is not limited to that in the vertical direction of the vehicle 100. The angle of the target object of interest in the advancing direction of the vehicle 100 may also be used.

In addition, the CPU 20 of the tilt detection apparatus 10 may omit the correcting unit 24. In this case, correction of the position of the detection point group (above-described step S50) may be omitted. Furthermore, the occupant of the vehicle 100 may not be notified when the determined tilt of the LiDAR apparatus 43 exceeds the first threshold range. Still further, autonomous driving of the vehicle 100 may not be stopped when the determined tilt of the LiDAR apparatus 43 exceeds the second threshold range.

The units such as the control unit and the method thereof described in the present disclosure may be implemented by a dedicated computer that is provided such as to be configured by a processor and a memory, the processor being programmed to provide one or a plurality of functions that are realized by a computer program.

Alternatively, the units such as the control unit and the method thereof described in the present disclosure may be implemented by a dedicated computer that is provided by a processor being configured by a single dedicated hardware logic circuit or more. Still alternatively, the units such as the control unit and the method thereof described in the present disclosure may be implemented by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions to be performed by the computer.

The present disclosure is not limited to the above-described embodiments. The present disclosure can be implemented through various configurations without departing from the spirit of the disclosure. For example, technical features according to the embodiments that correspond to technical features according to aspects described in the summary of the invention can be replaced and combined as appropriate to solve some or all of the above-described issued or to achieve some or all of the above-described effects. Furthermore, the technical features may be omitted as appropriate unless described as a requisite in the present specification.

What is claimed is:

1. A detection apparatus that detects a tilt of a LiDAR apparatus that is mounted to a vehicle, the detection apparatus comprising:
   a distance image acquiring unit that acquires a distance image that is expressed by a detection point group that is detected by the LiDAR apparatus;
   a surroundings information acquiring unit that acquires surroundings information on a periphery of a traveling route of the vehicle; and
   a detecting unit that determines the tilt of the LiDAR apparatus based on the acquired distance image and the acquired surroundings information and outputs the determined tilt to the vehicle to cause an operation of the vehicle to be controlled based on the determined tilt, wherein
   the detecting unit
      determines a target object of interest among objects that are present in the periphery of the traveling route, and
      determines the tilt of the LiDAR apparatus by detecting a difference between an angle of the target object of interest in a predetermined direction of the vehicle in the surroundings information and an angle of the target object of interest in the predetermined direction of the vehicle in the distance image.

2. The detection apparatus according to claim 1, wherein:
   the detecting unit
      determines a target object of interest among objects that are present in the periphery of the traveling route, and
      determines the tilt of the LiDAR apparatus by detecting a difference between an angle of the target object of interest in a vertical direction of the vehicle in the surroundings information and an angle of the target object of interest in the vertical direction of the vehicle in the distance image.

3. The detection apparatus according to claim 2, wherein:
the target object of interest includes a guardrail, a footbridge, a road information display board, and a traffic sign.

4. The detection apparatus according to claim 3, wherein:
the target object of interest is a building; and
the detecting unit determines the tilt of the LiDAR apparatus by comparing an edge in a horizontal direction of the target object of interest in the surroundings information and an edge in the horizontal direction of the target object of interest in the distance image.

5. The detection apparatus according to claim 4, further comprising:
a correcting unit that corrects a position in the vertical direction of the detection point group using the determined tilt of the LiDAR apparatus.

6. The detection apparatus according to claim 5, wherein:
the detecting unit notifies an occupant of the vehicle using a notification apparatus that is mounted to the vehicle in response to the determined tilt of the LiDAR apparatus exceeding a first threshold range that is prescribed in advance.

7. The detection apparatus according to claim 6, wherein:
the detecting unit enables the vehicle to stop autonomous driving of the vehicle in response to the determined tilt of the LiDAR apparatus exceeding a second threshold range that is greater than the first threshold range.

8. The detection apparatus according to claim 2, wherein:
the target object of interest is a building; and
the detecting unit determines the tilt of the LiDAR apparatus by comparing an edge in a horizontal direction of the target object of interest in the surroundings information and an edge in the horizontal direction of the target object of interest in the distance image.

9. The detection apparatus according to claim 2, further comprising:
a correcting unit that corrects a position in the vertical direction of the detection point group using the determined tilt of the LiDAR apparatus.

10. The detection apparatus according to claim 1, wherein:
the detecting unit notifies an occupant of the vehicle using a notification apparatus that is mounted to the vehicle in response to the determined tilt of the LiDAR apparatus exceeding a first threshold range that is prescribed in advance.

11. The detection apparatus according to claim 10, wherein:
the detecting unit enables the vehicle to stop autonomous driving of the vehicle in response to the determined tilt of the LiDAR apparatus exceeding a second threshold range that is greater than the first threshold range.

12. A detection method for detecting a tilt of a LiDAR apparatus that is mounted to a vehicle, the detection method comprising:
acquiring a distance image that is expressed by a detection point group that is detected by the LiDAR apparatus;
acquiring surroundings information on a periphery of a traveling route of the vehicle; and
determining the tilt of the LiDAR apparatus based on the acquired distance image and the acquired surroundings information and outputting the determined tilt to the vehicle to cause an operation of the vehicle to be controlled based on the determined tilt, wherein
the determining the tilt of the LiDAR apparatus includes
determining a target object of interest among objects that are present in the periphery of the traveling route, and
determining the tilt of the LiDAR apparatus by detecting a difference between an angle of the target object of interest in a predetermined direction of the vehicle in the surroundings information and an angle of the target object of interest in the predetermined direction of the vehicle in the distance image.

13. A system for detecting a tilt of a LiDAR apparatus that is mounted to a vehicle, the system comprising:
a processor;
a non-transitory computer-readable storage medium; and
a set of computer-executable instructions stored on the computer-readable storage medium that, in response to being read and executed by the processor, cause the processor to implement:
acquiring a distance image that is expressed by a detection point group that is detected by the LiDAR apparatus;
acquiring surroundings information on a periphery of a traveling route of the vehicle; and
determining the tilt of the LiDAR apparatus based on the acquired distance image and the acquired surroundings information and outputting the determined tilt to the vehicle to cause an operation of the vehicle to be controlled based on the determined tilt, wherein
the determining the tilt of the LiDAR apparatus includes
determining a target object of interest among objects that are present in the periphery of the traveling route, and
determining the tilt of the LiDAR apparatus by detecting a difference between an angle of the target object of interest in a predetermined direction of the vehicle in the surroundings information and an angle of the target object of interest in the predetermined direction of the vehicle in the distance image.

* * * * *

EX PARTE REEXAMINATION CERTIFICATE (241st)
Ex Parte Reexamination Ordered under 35 U.S.C. 257

United States Patent
Hoashi

(10) Number: US 11,650,321 C1
(45) Certificate Issued: Apr. 4, 2024

(54) APPARATUS AND METHOD FOR DETECTING TILT OF LiDAR APPARATUS MOUNTED TO VEHICLE

(71) Applicant: DENSO CORPORATION, Kariya (JP)

(72) Inventor: Yoshiaki Hoashi, Kariya (JP)

(73) Assignee: DENSO CORPORATION

Supplemental Examination Request:
No. 96/000,435, Jun. 22, 2023

Reexamination Certificate for:
Patent No.: 11,650,321
Issued: May 16, 2023
Appl. No.: 17/038,264
Filed: Sep. 30, 2020

(30) Foreign Application Priority Data

Sep. 30, 2019 (JP) .................. 2019-178465

(51) Int. Cl.
*B60W 60/00* (2020.01)
*B60W 30/095* (2012.01)
*B60W 50/14* (2020.01)
*G01S 7/497* (2006.01)
*G01S 17/86* (2020.01)
*G01S 17/89* (2020.01)
*G01S 17/931* (2020.01)
*G05D 1/00* (2006.01)
*G05D 1/02* (2020.01)
*G06V 10/24* (2022.01)
*G06V 10/44* (2022.01)
*G06V 20/58* (2022.01)
*G06V 20/64* (2022.01)

(52) U.S. Cl.
CPC ......... *G01S 17/89* (2013.01); *B60W 30/0956* (2013.01); *B60W 50/14* (2013.01); *B60W 60/001* (2020.02); *B60W 60/0053* (2020.02); *G01S 7/4972* (2013.01); *G01S 17/86* (2020.01); *G01S 17/931* (2020.01); *G05D 1/0214* (2013.01); *G06V 10/243* (2022.01); *G06V 10/44* (2022.01); *G06V 20/58* (2022.01); *G06V 20/582* (2022.01); *G06V 20/64* (2022.01); *B60W 2420/408* (2024.01); *B60W 2554/20* (2020.02)

(58) Field of Classification Search
None
See application file for complete search history.

(56) References Cited

To view the complete listing of prior art documents cited during the supplemental examination proceeding and the resulting reexamination proceeding for Control Number 96/000,435, please refer to the USPTO's Patent Electronic System.

*Primary Examiner* — Matthew E Heneghan

(57) ABSTRACT

A detection apparatus detects a tilt of a LiDAR apparatus that is mounted to a vehicle. The detection apparatus includes a distance image acquiring unit, a surroundings information acquiring unit, and a detecting unit. The distance image acquiring unit acquires a distance image that is expressed by a detection point group that is detected by the LiDAR apparatus. The surroundings information acquiring unit acquires surroundings information on a periphery of a traveling route of the vehicle. The detecting unit that determines the tilt of the LiDAR apparatus based on the acquired distance image and the acquired surroundings information.

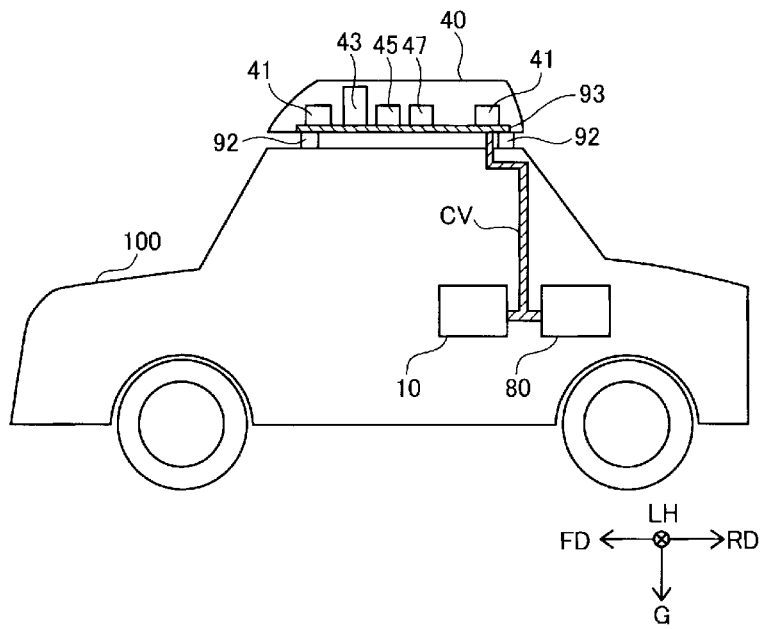

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12 and 13 is confirmed.

Claim 1 is determined to be patentable as amended.

Claims 2-11, dependent on an amended claim, are determined to be patentable.

1. A detection apparatus that detects a tilt of a LiDAR apparatus that is mounted to a vehicle, the detection apparatus comprising:
    *at least one electronic control unit mounted to the vehicle and comprising a central processing unit, the central processing unit comprising:*
    a distance image acquiring unit that acquires a distance image that is expressed by a detection point group that is detected by the LIDAR apparatus;
    a surroundings information acquiring unit that acquires surroundings information on a periphery of a traveling route of the vehicle; and
    a detecting unit that determines the tilt of the LiDAR apparatus based on the acquired distance image and the acquired surroundings information and outputs the determined tilt to the vehicle to cause an operation of the vehicle to be controlled based on the determined tilt, wherein
    *the determining of the tilt of the LIDAR apparatus by* the detecting unit [determines] *includes determining* a target object of interest among objects that are present in the periphery of the traveling route, and
    [determines] *determining* the tilt of the LiDAR apparatus by detecting a difference between an angle of the target object of interest in a predetermined direction of the vehicle in the surroundings information and an angle of the target object of interest in the predetermined direction of the vehicle in the distance image.

\* \* \* \* \*